United States Patent Office 3,173,912
Patented Mar. 16, 1965

3,173,912
BENZODIAZEPINES
John Krapcho, New Brunswick, N.J., assignor to Olin Mathieson Chemical Corporation, New York, N.Y., a corporation of Virginia
No Drawing. Filed Oct. 2, 1961, Ser. No. 142,033
12 Claims. (Cl. 260—239.3)

This invention relates to new chemical compounds having valuable therapeutic properties and processes for the preparation thereof.

The therapeutically active compounds of this invention are bases of the general Formula I:

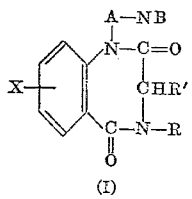

(I)

and the acid-addition salts thereof, wherein X is hydrogen, lower alkyl, lower alkoxy, nitro, halo or trifluoromethyl; R and R' are each hydrogen, lower alkyl, lower alkenyl, lower alkynyl, an X-substituted phenyl lower alkyl, an X-substituted phenyl, furyl, thienyl, pyridyl or piperonyl; A is lower alkylene (preferably ethylene and trimethylene); and NB is a basic nitrogen-containing radical of less than twelve carbon atoms. Among the suitable radicals represented by the symbol NB are: amino; (lower alkyl)-amino; di(lower alkyl)amino; (hydroxy-lower alkyl)amino; di(hydroxy-lower alkyl)amino; phenyl (lower alkyl)amino; N-(lower alkyl)-N-phenyl(lower alkyl)amino; and saturated 5 to 6 membered monocyclic heterocyclic radicals of less than twelve carbon atoms, as exemplified by piperidino; (lower alkyl)piperidino; di(lower alkyl)piperidino; (lower alkoxy)piperidino; 2, 3 or 4-piperidyl; 2, 3 or 4-(N-lower alkyl-piperidyl); pyrrolidino; (lower alkyl)-pyrrolidino; di(lower alkyl) pyrrolidino; (lower alkoxy)-pyrrolidino; 2 or 3-pyrrolidyl; 2 or 3-(N-lower alkyl-pyrrolidyl); morpholino; (lower alkyl)morpholino; di(lower alkyl)morpholino; (lower alkoxy)morpholino; thiamorpholino, (lower alkyl)thiamorpholino; di(lower alkyl)thiamorpholino; (lower alkoxy) thiamorpholino; piperazino; (lower alkyl)piperazino; (lower N⁴-methylpiperazino); di(lower alkyl)piperazino; (lower alkoxy)piperazino; (hydroxy lower alkyl)piperazino (e.g., N⁴-2-hydroxy ethyl piperazino); (lower alkoxy lower alkyl)piperazino; and (lower alkanoyloxy lower alkyl)piperazino (e.g., N⁴-2-acetoxy ethyl piperazino). The terms "lower alkyl," "lower alkoxy," and "lower alkylene," as employed herein, include both straight and branched chain radicals of less than eight carbon atoms. The particularly preferred compounds are those wherein X is hydrogen or chloro, R is phenyl, R' is hydrogen, A is ethylene or trimethylene and NB is di(lower alkyl)amino.

As to the salts, those coming within the purview of this invention include the acid-addition salts, particularly the non-toxic acid-addition salts, and the quaternary ammonium salts. Acids useful for preparing these acid-addition salts include, inter alia, inorganic acids, such as the hydrohalic acids (e.g., hydrochloric and hydrobromic acid), sulfuric acid, nitric acid, boric acid and phosphoric acid, and organic acids such as oxalic, tartaric, citric, acetic and succinic acid, theophylline and 8-chloro-theophylline. The quaternary ammonium salts include those formed with lower alkyl halides (e.g., methyl bromide, ethyl chloride and propyl iodide) and di-lower alkyl sulfates (e.g., dimethyl sulfate). In addition, the compounds of this invention are useful as tranquilizers and thus can be administered in the treatment of irrational fears, anxiety and tension, the dosage for such treatment being adjusted for the activity of the particular compound employed.

The compounds of this invention can be prepared by condensing new intermediates of this invention of the Formula II:

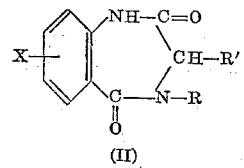

(II)

wherein X, R and R' are as hereinbefore defined, with an aminoalkyl halide of the formula BN–A–Y, wherein NB and A are as hereinbefore defined and Y is halide, particularly chloride. This reaction is preferably conducted by heating the reactants in the presence of a basic condensing agent, such as an alkali metal, an alkali metal amide (e.g., sodamide), or an alkali metal hydroxide. To form the acid-addition salts, the free base initially formed is interacted with at least one equivalent of the desired acid.

To prepare the new intermediate (the compounds of Formula II) a 2-nitrobenzyl halide of the Formula III:

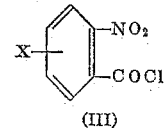

(III)

wherein X is as hereinbefore defined, is interacted with a glycine of the Formula IV:

RNHCHCOOZ
|
R'

(IV)

wherein Z is alkali metal or lower alkyl. The reaction results in the preparation of new compounds of this invention of the Formula V:

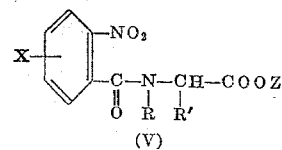

(V)

wherein X, Z, R and R' are as hereinbefore defined.

These compounds are then reduced by treating with hydrogen in the presence of a hydrogenation catalyst, such as a noble metal catalyst (e.g., palladium on carbon) to yield the corresponding o-amino derivatives of the Formula VI:

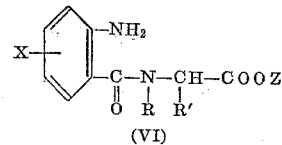

(VI)

wherein X, Z, R and R' are as hereinbefore defined.

Either prior to or after the reduction, the nitro compound V or the amino compound VI is treated with a dilute acid, such as a dilute mineral acid (e.g., hydrochloric acid) to convert the salt or ester to its acid derivative (Z is hydrogen). If this is done prior to the reduction, the resulting o-amino-acid immediately cyclizes to yield compounds of the Formula II. If the hydrolysis is carried out after the reduction and an ester is employed as the reactant (Z is lower alkyl), the amino compounds VI are initially formed. These compounds are then hydrolyzed and preferably heated to cyclize the resulting o-amino acid. Thereby yielding the compounds of the Formula II.

Suitable reactants III include 2-nitrobenzoyl chloride; 2-nitro(lower alkyl)benzoyl chlorides, such as 2-nitrotoluoyl chlorides (e.g., 2-nitro-p-toluoyl chloride), 2-nitro-ethyl benzoyl chlorides, 2-nitro-n-propylbenzoyl chlorides, 2-nitro-isopropylbenzoyl chlorides, 2-nitro-butylbenzoyl chlorides, and 2-nitro-hexylbenzoyl chlorides; 2-nitro-lower alkoxybenzoyl chlorides, such as 2-nitro-methoxybenzoyl chlorides (e.g., 2-nitro-p-anisoyl chloride), 2-nitro-ethoxybenzoyl chlorides, 2-nitro-n-propoxybenzoyl chlorides, and 2-nitro-pentoxybenzoyl chlorides; 2-nitro-halobenzoyl chlorides, such as 2-nitro-chlorobenzoyl chlorides (e.g., 2-nitro-4-chlorobenzoyl chloride), 2-nitro-bromobenzoyl chlorides and 2-nitro-fluorobenzoyl chlorides; and 2-nitro-trifluoromethylbenzoyl chlorides, such as 2-nitro-4-trifluoro-methylbenzoyl chlorides.

Suitable reactants IV include the alkali metal salts (e.g., the sodium and potassium salts) and lower alkyl esters (e.g., the methyl and ethyl esters) of glycine; N-substituted glycines, such as N-(lower alkyl)glycines (e.g., sarcosine, N-ethylglycine, N-n-propylglycine, N-isopropylglycine, N-n-isopropylglycine, N-n-hexylglycine and N-n-octylglycine), N-(lower alkenyl)glycines (e.g., N-allylglycine), N-(lower alkynyl)glycines (e.g., N-2-propynyl-glycine), N-(phenyl-lower alkyl)glycines, (e.g., N-benzyl-glycine, N-phenethylglycine, and N-3-phenylpropylglycine) and aromatically substituted lower alkyl, lower alkoxy, halo and trifluoromethyl derivatives thereof, N-phenylglycine and aromatically substituted lower alkyl, lower alkoxy, halo and trifluoromethyl derivatives thereof, N-furylglycine, N-thienyl glycine, N-pyridylglycine and N-piperonylglycine; α-substituted glycines, such as 2-(lower alkyl)glycines (e.g., 2-amino-propionic acid, 2-aminobutyric acid, 2-aminopentanoic acid, and 2-amino-hexanoic acid), 2-(phenyl-lower alkyl)glycines (e.g., 2-amino-3-phenylpropionic acid, 2-amino-4-phenylbutyric acid, 2-amino-5-phenylpentanoic acid and 2-amino-6-phenylhexanoic acid) and aromatically substituted lower alkyl, lower alkoxy, halo and trifluoromethyl derivatives thereof, 2-phenylglycine and aromatically substituted lower alkyl, lower alkoxy, halo and trifluoromethyl derivatives thereof, 2-furylglycine, 2-thienylglycine, 2-pyridylglycine and 2-piperonylglycine; and α,N-disubstituted glycines, such as 2,N-di(lower alkyl) glycines, 2-(lower alkyl)-N-phenylglycines, 2-phenyl-N-(lower alkyl)glycines, 2-(lower alkyl)-N-(phenyl lower alkyl)glycines, 2,N-di(phenyl lower alkyl)glycines, 2,N-diphenylglycine, 2-phenyl-N-furylglycine, and lower alkyl, lower alkoxy, halo, and trifluoromethylated derivatives of those compounds which contain a phenyl ring.

The following examples illustrate the invention (all temperatures being in centigrade):

EXAMPLE 1

*Preparation of 3,4-dihydro 4-phenyl-1H-1,4-benzodiazepine-2,5-dione*

(a) *Preparation of N-(o-nitrobenzoyl)-N-phenylglycine.*—A suspension of o-nitrobenzoic acid in 300 ml. of chloroform is cooled to 5°, treated with 80 ml. of thionyl chloride and the resulting suspension then refluxed for one hour. About 200 ml. of solvent is then distilled and the remainder of the solvent removed under reduced pressure to give about 111 g. of o-nitrobenzoyl chloride. This acid chloride is dissolved in 100 ml. of chloroform and added dropwise to a cooled (5–10°) and stirring solution of 114 g. of N-phenylglycine, potassium salt in 150 ml. of water. During this addition period (thirty minutes) is added also a solution of 25 g. of sodium hydroxide in 200 ml. of water to neutralize the acid liberated from the reaction. The mixture is stirred for an additional hour in the ice bath, treated with Darco and filtered. The filtrate is then treated with a solution of 100 ml. of conc. hydrochloric acid in 100 ml. of water to give a semi-solid. This material is filtered, triturated with 100 ml. of chloroform and dried to give a pale yellow solid weighing about 152 g., M.P. about 100–130°. After two crystallizations from 500 ml. of chloroform, the colorless solid weighs about 67 g., M.P. about 133–135°. Recrystallization from isopropyl alcohol gives a colorless solid melting at about 137–139°.

(b) *Preparation of 4-phenyl-3,4-dihydro-1H-1,4-benzodiazepine-2,5-dione.*—A solution of 15 g. of material from step a in 150 ml. of absolute alcohol is treated with 2 g. of 5% palladium carbon and the mixture hydrogenated at 58 pounds of hydrogen at room temperature. The reaction is complete in three minutes. The catalyst is filtered and the filtrate concentrated to about 50 ml. and cooled. The resulting colorless product weighs about 9.9 g., M.P. about 196–198°.

EXAMPLE 2

*1-(2-dimethylaminoethyl)-4-phenyl-3,4-dihydro-1H-1,4-benzodiazepine-2,5-dione*

A suspension of 11.4 g. of 4-phenyl-1H-1,4-benzodiazepine-2,3-(3H,4H)-dione in 200 ml. of toluene is added to a suspension of 1.8 g. of sodamide in 500 ml. of toluene. The resulting suspension is warmed to 60°, then cooled to 30° and treated with a solution of 6.2 g. of 2-dimethylaminoethyl chloride in 45 ml. of toluene. This mixture is refluxed for two hours, cooled and treated with 100 ml. of water. The aqueous phase is discarded and the organic layer extracted with a solution of 10 ml. of conc. hydrochloric acid in 100 ml. of water. This aqueous layer is cooled and treated with a solution of 8 g. of sodium hydroxide in 20 ml. of water. The liberated base is extracted three times with 200 ml. portions of ether and the extracts dried over magnesium sulfate. After evaporation of the solvent, the residual solid is triturated with cold hexane and filtered to give about 7.0 g. of colorless product, M.P., about 149–151°. After crystallization from 30 ml. of toluene, the product melts at about 151–153°.

EXAMPLE 3

*1-(2-dimethylaminoethyl)-4-phenyl-3,4-dihydro-1H-1,4-benzodiazepine-2,5-dione hydrochloride*

A solution of 5.8 g. of the material from Example 2 in 20 ml. of absolute alcohol and 10 ml. of methanol is treated with 3 ml. of 6 N alcoholic hydrogen chloride. The hydrochloride salt crystallizes from solution. After dilution with 100 ml. of ether, the product is filtered to give about 6.5 g. of colorless product, M.P. about 260–262°.

After recrystallization from methanol, the product melts at about 262–263°.

EXAMPLE 4

*1-(3-dimethylaminopropyl)-4-phenyl-3,4-dihydro-1,4-benzodiazepine-2,5-dione hydrochloride*

Following the procedure of Examples 2 and 3 but substituting an equivalent amount of 3-dimethylaminopropyl chloride for the 2-dimethylaminoethyl chloride in Example 2, 1-(3-dimethylaminopropyl)-4-phenyl-1,4-benzodiazepine-2,5-dione hydrochloride is obtained. After crystallization from acetonitrile and then isopropyl alcohol-ether, the product melts at about 206–207°.

EXAMPLE 5

*1-(2-diethylaminoethyl)-4-phenyl-3,4-dihydro-1,4-benzodiazepine-2,5-dione hydrochloride*

Following the procedures of Examples 2 and 3 but substituting an equivalent amount of 2-diethylaminoethyl chloride for the 2-dimethylaminoethyl chloride in Example 2, 1-(2-diethylaminoethyl)-4-phenyl-3,4-dihydro-1,4-benzodiazepine-2,5-dione hydrochloride is obtained.

EXAMPLE 6

1-(2-pyrrolidinoethyl)-4-phenyl-3,4-dihydro-1,4-benzodiazepine-2,5-dione

Following the procedure of Example 2 but substituting an equivalent amount of 2-pyrrolidinoethyl chloride for the 2-dimethylaminoethyl chloride, 1-(2-pyrrolidinoethyl) - 4-phenyl-3,4-dihydro-1,4-benzodiazepine-2,5-dione is obtained.

EXAMPLE 7

1-[2-(N-methyl-N-phenethylamino)ethyl]-4-phenyl-3,4-dihydro-1,4-benzodiazepine-2,5-dione hydrochloride Following the procedure of Examples 2 and 3 but substituting an equivalent amount of 2-(N-methyl-N-phenethylamino)ethyl chloride for the 2-dimethylaminoethyl chloride in Example 2, 1-[2-(N-methyl-N-phenethylamino)ethyl] - 4 - phenyl - 3,4-dihydro-1,4-benzodiazepine-2,5-dione hydrochloride is obtained.

EXAMPLE 8

1-(2-morpholinoethyl)-4-phenyl-3,4-dihydro 1,4-benzodiazepine-2,5-dione hydrochloride Following the procedures of Examples 2 and 3 but substituting an equivalent amount of 2-morpholinoethyl chloride for the 2-dimethylaminoethyl chloride in Example 2, 1-(2-morpholinoethyl)-4-phenyl-1,4-benzodiazepine-2,5-dione hydrochloride is obtained.

EXAMPLE 9

1-(2-piperidinoethyl)-4-phenyl-3,4-dihydro-1,4-benzodiazepine-2,5-dione hydrochloride Following the procedures of Examples 2 and 3 but substituting an equivalent amount of 2-piperidinoethyl chloride for the 2-dimethylaminoethyl chloride in Example 2, 1-(2-piperidinoethyl)-4-phenyl-3,4-dihydro-1,4-benzodiazepine-2,5-dione hydrochloride is obtained.

EXAMPLE 10

1-[3-(4-methyl-1-piperazinyl)propyl]-4-phenyl-3,4-dihydro-1,4-benzodiazepine-2,5-dione hydrochloride Following the procedures of Examples 2 and 3 but substituting an equivalent amount of 3-(4-methyl-1-piperazinyl)propyl chloride for the 2-dimethylaminoethyl chloride in Example 2, 1-[3-(4-methyl-1-piperazinyl)propyl] - 4 - phenyl-3,4-dihydro-1,4-benzodiazepine 2,5-dione hydrochloride is obtained.

EXAMPLE 11

1-(2-dimethylaminoethyl)-4-methyl-3,4-dihydro-1,4-benzodiazepine-2,5-dione hydrochloride (a) *Preparation of N-(o-nitrobenzoyl)-N-methylglycine.*—Following the procedure of Example 1, step a, but substituting an equivalent amount of the sodium salt of sarcosine for the N-phenylglycine, potassium salt, N-(o-nitrobenzoyl)-N-methylglycine is obtained.

(b) *Preparation of 4-methyl-3,4-dihydro-1,4-benzodiazepine-2,5-dione.*—Following the procedure of Example 1, step b, but substituting an equivalent amount of N-(o-nitrobenzoyl)-N-methylglycine for the N-(o-nitrobenzoyl)-N-phenylglycine, 4 - methyl - 3,4 - dihydro - 1,4-benodiazepine-2,5-dione is obtained.

(c) *Preparation of 1-(2-dimethylaminoethyl)-4-methyl-3,4 - dihydro - 1,4 - benzodiazepine - 2,5 - dione hydrochloride.*—Following the procedure of Examples 2 and 3, but substituting an equivalent amount of 4-methyl-3,4-dihydro-1,4-benzodiazepine-2,5-dione for the 4-phenyl-3,4-dihydro-1,4-benzodiazepine-2,5-dione in Example 2, 1-(2 - dimethyl aminoethyl) - 4 - methyl - 3,4 - dihydro - 1,4-benzodiazepine-2,5-dione hydrochloride is obtained.

EXAMPLE 12

1-(2-dimethylaminoethyl)-3-methyl-4-phenyl-3,4-dihydro-1,4-benzodiazepine-2,5-dione hydrochloride Following the procedure of Examples 1, 2 and 3, but substituting an equivalent amount of 2 - phenylaminopropionic acid, potassium salt, for the N-phenylglycine, potassium salt in step a of Example 1, 1-(2-dimethylaminoethyl) - 3 - methyl - 4 - phenyl - 3,4 - dihydro - 1,4-benzodiazepine-2,5-dione hydrochloride is obtained.

EXAMPLE 13

1-(2-dimethylaminoethyl)-4-(4-methoxyphenyl)-3,4-dihydro-1,4-benzodiazepine-2,5-dione hydrochloride Following the procedures of Examples 1, 2 and 3, but substituting an equivalent amount of N - (4 - methoxyphenyl)glycine, potassium salt, for the N-phenylglycine, potassium salt in step a of Example 1, 1-(2-dimethylaminoethyl) - 4 - (4 - methoxyphenyl) - 3,4 - dihydro-1,4-benzodiazepine-2,5-dione hydrochloride is obtained.

EXAMPLE 14

1-(2-dimethylaminoethyl)-4-(2-methoxyphenyl)-3,4-dihydro-1,4-benzodiazepine-2,5-dione hydrochloride Following the procedure of Examples 1, 2 and 3, but substituting an equivalent amount of N - (2 - methoxyphenyl)glycine, potassium salt, for the N-phenylglycine, potassium salt, for the N-phenylglycine, potassium salt, in step a of Example 1, 1-(2-dimethylaminoethyl)-4-(2-methoxyphenyl)-3,4-dihydro-1,4-benzodiazepine-2,5-dione hydrochloride is obtained.

EXAMPLE 15

1-(2-dimethylaminoethyl)-4-(4-chlorophenyl)-3,4-dihydro-1,4-benzodiazepine-2,5-dione hydrochloride Following the procedures of Examples 1, 2 and 3, but substituting an equivalent amount of N-(4-chlorophenyl) glycine, potassium salt, for the N-phenylglycine, potassium salt, in step a of Example 1, 1-(2-dimethylaminoethyl) - 4 - (4-chlorophenyl) - 3,4 - dihydro - 1,4 - benzodiazepine-2,5-dione hydrochloride is obtained.

EXAMPLE 16

1-(2-dimethylaminoethyl)-4-p-tolyl-3-4-dihydro-1,4-benzodiazepine-2,5-dione hydrochloride Following the procedures of Examples 1, 2 and 3, but substituting an equivalent amount of N,p-tolylglycine, potassium salt, for the N-phenylglycine, potassium salt, in step a of Example 1, 1-(2-dimethylaminoethyl)-4-p-tolyl - 3,4 - dihydro - 1,4 - benzodiazepine - 2,5 - dione hydrochloride is obtained.

EXAMPLE 17

1-(2-dimethylaminoethyl)-3-(3-furyl)-3,4-dihydro-1,4-benzodiazepine-2,5-dione hydrochloride Following the procedures of Examples 1, 2 and 3, but substituting an equivalent amount of N-(3-furyl)glycine, potassium salt, for the N-phenylglycine, potassium salt, in step a of Example 1, 1-(2-dimethylaminoethyl)-4-(3-furyl)-3,4-dihydro-1,4-benzodiazepine - 2,5 - dione hydrochloride is obtained.

EXAMPLE 18

1-(2-dimethylaminoethyl)-4-(3-piperonyl)-3,4-dihydro-1,4-benzodiazepine-2,5-dione hydrochloride Following the procedures of Examples 1, 2 and 3, but substituting an equivalent amount of N-(3-piperonyl) glycine, potassium salt, for the N-phenylglycine, potassium salt, in step a of Example 1, 1-(2-dimethylaminoethyl) - 4 - (3 - piperonyl) - 3,4 - dihydro - 1,4 - benzodiazepine-2,5-dione hydrochloride is obtained.

Similarly, by following the procedures of Examples 1, 2 and 3, but substituting an equivalent amount of the potassium salt of N-(4-pyridyl)glycine, α-(2-pyridyl)glycine and N-(2-thienyl)glycine for the N-phenylglycine, potassium salt, in step *a* of Example 1, the hydrochloride salts of 1 - (2-dimethylaminoethyl)-4-(4-pyridyl)-3,4-dihydro-1,4-benzodiazepine-2,5-dione, 1,-(2-dimethylaminoethyl) - 3 - (2-pyridyl)-3,4-dihydro-1,4-benzodiazepine-2,5 dione, and 1 - (2-dimethylaminoethyl)-4-(thienyl)-3,4-dihydro-1,4-benzodiazepine-2,5-dione are obtained, respectively.

EXAMPLE 19

*1-(2-dimethylaminoethyl)-3-ethyl-3,4-dihydro-1,4-benzodiazepine-2,5-dione hydrochloride*

Following the procedures of Examples 1, 2 and 3, but substituting an equivalent amount of the potassium salt of 2-aminobutyric acid for the N-phenylglycine, potassium salt, in step *a* of Example 1, 1-(2-dimethylaminoethyl)-3,4-dihydro-1,4-benzodiazepine - 2,5 - dione hydrochloride is obtained.

EXAMPLE 20

*7-chloro-1-(2-dimethylaminoethyl)-4-phenyl-3,4-dihydro-1,4-benzodiazepine-2,5-dione hydrochloride*

Following the procedures of Examples 1, 2 and 3, but substituting an equivalent amount of 2-nitro-4-chlorobenzoic acid for the o-nitrobenzoic acid in step *a* of Example 1, 7-chloro-1-(2-dimethylaminoethyl)-4-phenyl-3,4-dihydro-1,4-benzodiazepine-2,5-dione hydrochloride is obtained.

EXAMPLE 21

*7-methyl-1-(2-dimethylaminoethyl)-4-phenyl-3,4-dihydro-1,4-benzodiazepine-2,5-dione hydrochloride*

Following the procedures of Examples 1, 2 and 3, but substituting an equivalent amount of o-nitro-p-toluic acid for the o-nitrobenzoic acid in step *a* of Example 1, 7-methyl-1-(2-dimethylaminoethyl)-4-phenyl-3,4 - dihydro-1,4-benzodiazepine-2,5-dione hydrochloride is obtained.

EXAMPLE 22

*7-methoxy-1-(2-dimethylaminoethyl)-4-phenyl-3,4-dihydro-1,4-benzodiazepine-2,5-dione hydrochloride*

Following the procedure of Examples 1, 2 and 3, but substituting an equivalent amount of o-nitro-p-methoxybenzoic acid for the o-nitrobenzoic acid in step *a* for Example 1, 7-methoxy-1-(2-dimethylaminoethyl)-4-phenyl-3,4-dihydro-1,4-benzodiazepine-2,5-dione hydrochloride is obtained.

EXAMPLE 23

*7-(trifluoromethyl)-1-(2-dimethylaminoethyl)-4-phenyl-3,4-dihydro-1,4-benzodiazepine-2,5-dione hydrochloride*

Following the procedure of Examples 1, 2 and 3, but substituting an equivalent amount of o-nitro-p-trifluoromethylbenzoic acid for the o-nitrobenzoic acid in step *a* of Example 1, 7-(trifluoromethyl)-1-(2-dimethylaminoethyl) - 4 - phenyl-3,4-dihydro-1,4 - benzodiazepine - 2,5-dione hydrochloride is obtained.

EXAMPLE 24

*1-(2-dimethylaminoethyl)-3,4-dihydro-1,4-benzodiazepine-2,5-dione hydrochloride*

Following the procedures of Examples 1, 2 and 3, but substituting an equivalent amount of glycine, potassium salt, for the N-phenylglycine, potassium salt, in step *a* of Example 1, 1-(2-dimethylaminoethyl)-3,4-dihydro - 1,4-benzodiazepine -2,5-dione hydrochloride is obtained.

EXAMPLE 25

*4-benzyl-3,4-dihydro-1H-1,4-benzodiazepine-2,5-dione*

(*a*) *Preparation of N-(o-nitrobenzoyl)-N-benzylglycine.*—To a solution of 78 g. of N-benzylglycine, ethyl ester [J. Amer. Chem. Soc. 72, 1236 (1950)], 40.9 g. of triethylamine and 950 ml. of benzene, cooled to 0°, is added dropwise a solution of o-nitrobenzoyl chloride in 250 ml. of benzene. After stirring for one hour at 5–10°, the mixture is refluxed for ninety minutes, cooled and extracted twice with 100 ml. portions of water, then three times with 100 ml. portions of N hydrochloric acid and finally with 100 ml. of saturated sodium chloride solution. The organic phase is dried over magnesium sulfate, filtered and the filtrate concentrated to give about 131 g. of oil. This material crystallizes from 225 ml. of 95% alcohol to give about 122 g. of pale yellow crystals, melting at about 78–80°. After recrystallization from 95% alcohol, the material melts at about 85–87°.

(*b*) *Preparation of 4-benzyl-3,4-dihydro-1H-1,4-benzodiazepine-2,5-dione.*—A mixture of 17.1 g. of material from part (*a*), 150 ml. of absolute alcohol and 2 g. of 5% palladium on carbon is reduced under fifty pounds of hydrogen pressure. Hydrogenation is complete in ten minutes. The mixture is filtered and the filtrates from six runs are combined and the solvent removed under reduced pressure. To this residue is added a solution of 27 ml. of conc. hydrochloric acid in 600 ml. of water and the mixture stirred at room temperature for fifteen minutes. The aqueous layer is discarded and the residue oil is treated with 200 ml. of 95% alcohol and the mixture refluxed for five minutes, diluted with 100 ml. of water and cooled to give about 89 g. of crystalline product, M.P. about 169–172°. After crystallization from acetonitrile, the colorless product melts at about 172–174°.

EXAMPLE 26

*1-(2-dimethylaminoethyl)-4-benzyl-3,4-dihydro-1H-1,4-benzodiazepine-2,5-dione hydrochloride*

Interaction of 26.6 g. of material from part (*b*) of Example 25, 4.3 g. of sodamide and 13 g. of dimethylaminoethyl chloride in toluene according to the procedure used in Example 2 gives about 18.5 g. of base as an oil. This material is dissolved in 500 ml. of ether, filtered and the filtrate treated with 9.5 ml. of 6 N alcoholic hydrogen chloride to give a gummy solid. After crystallization from 100 ml. of isopropyl alcohol, the colorless solid weights about 14.2 g. and melts at about 190–191°.

EXAMPLE 27

*1-(3-dimethylaminopropyl)-4-benzyl-3,4-dihydro-1H-1,4-benzodiazepine-2,5-dione hydrochloride*

Substitution of an equivalent amount of 3-dimethylaminopropyl chloride for the 2-dimethylaminoethyl chloride in Example 26 yields the hydrochloride salt. After crystallization from acetonitrile, it melts at about 187–189°.

EXAMPLE 28

*4-allyl-3,4-dihydro-1H-1,4-benzodiazepine-2,5-dione*

Utilizing the procedure used in Example 25 but substituting 58 g. of ethyl N-allylglycinate [J. Org. Chem. 25, 729 (1960)] for the ethyl N-benzylglycinate in part (*a*) there is obtained 4-allyl-3,4-dihydro-1H-1,4-benzodiazepine-2,5-dione.

EXAMPLE 29

*1-(2-dimethylaminoethyl)-4-allyl-3,4-dihydro-1H-1,4-benzodiazepine-2,5-dione*

Substitution of an equivalent quantity of material from Example 28 for the 4-phenyl-3,4-dihydro-1H-1,4-benzodiazepine-2,5-dione in Example 2 yields 1-(2-dimethylaminoethyl)-4-allyl-3,4-dihydro-1H-1,4 - benzodiazepine-2,5-dione.

EXAMPLE 30

*1-(2-dimethylaminoethyl)-4-phenyl-3,4-dihydro-1H-1,4-benzodiazepine-2,5-dione, methobromide*

A solution of 16 g. of material from Example 2 in 100 ml. of acetonitrile is treated with 10 g. of methyl bromide. After standing for eight hours at room temperature, the mixture is diluted with 200 ml. of ether and the colorless solid, 1-(2-dimethylaminoethyl)-4-phenyl-3,4-dihydro - 1H - 1,4-benzodiazepine-2,5-dione, methobromide, is obtained.

This invention may be variously otherwise embodied within the scope of the appended claims.

What is claimed is:

1. A compound selected from the group consisting of bases of the formula

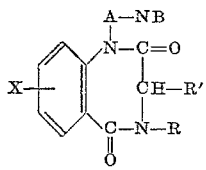

and pharmaceutically-acceptable salts thereof, wherein X is selected from the group consisting of hydrogen, lower alkyl, lower alkoxy, halo and trifluoromethyl; R and R' are each selected from the group consisting of hydrogen, lower alkyl, lower alkenyl, lower alkynyl, X-phenyl-lower alkyl, X-phenyl, furyl, thienyl, pyridyl and piperonyl; A is lower alkylene; and NB is a member of the group consisting of amino; (lower alkyl)amino; di(lower alkyl)amino; (hydroxy-lower alkyl)amino; di(hydroxy-lower alkyl)amino; phenyl(lower alkyl)amino; N-(lower alkyl) - N - phenyl(lower alkyl)amino; piperidino; (lower alkyl)piperidino; di(lower alkyl)piperidino; (lower alkoxy)piperidino; piperidyl; (N-lower alkylpiperidyl); pyrrolidino; (lower alkyl)pyrrolidino; di(lower alkyl)pyrrolidino; (lower alkoxy)pyrrolidino; pyrrolidyl; (N-lower alkyl-pyrrolidyl); morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; (lower alkyl)piperazino; di(lower alkyl)piperazino; (lower alkoxy)piperazino; (hydroxy lower alkyl)piperazino; (lower alkoxy lower alkyl)piperazino; and (lower alkanoyloxy lower alkyl)piperazino.

2. A compound of the formula

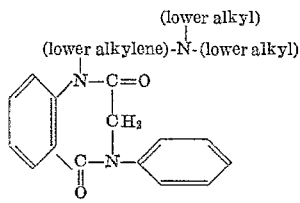

3. A pharmaceutically-acceptable acid-addition salt of the compound of claim 2.

4. A compound of the formula

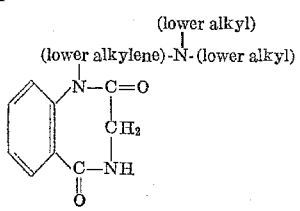

5. A pharmaceutically-acceptable acid-addition salt of the compound of claim 4.

6. A compound of the formula

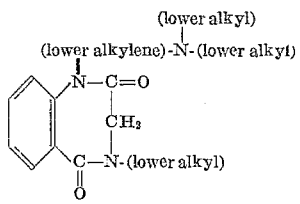

7. A pharmaceutically-acceptable acid-addition salt of the compound of claim 6.

8. 4-phenyl-3,4-dihydro-1,4-benzodiazepine-2,5-dione.

9. 1-(2-dimethylaminoethyl) - 4 - phenyl - 3,4-dihydro-1,4-benzodiazepine-2,5-dione.

10. 1-(2-dimethylaminoethyl) - 4 - phenyl-3,4-dihydro-1,4-benzodiazepine-2,5-dione hydrochloride.

11. 4-benzyl - 3,4 - dihydro - 1,4 - benzodiazepine-2,5-dione.

12. A compound of the formula

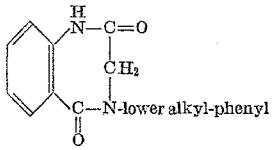

References Cited by the Examiner

UNITED STATES PATENTS

| | | | |
|---|---|---|---|
| 2,073,100 | 3/37 | Eisleb | 260—471 |
| 2,264,358 | 12/41 | Bock | 260—471 |
| 2,286,718 | 6/42 | Curtis | 260—471 |
| 2,957,867 | 10/60 | Werner | 260—239 |
| 2,999,091 | 9/61 | Zaugg | 260—239.3 |
| 3,000,880 | 9/61 | Phillips et al. | 260—239.3 |

OTHER REFERENCES

Miyatake et al.: Journal of the Pharmaceutical Society of Japan, vol. 72, pp. 1160–61 (1952).

IRVING MARCUS, *Primary Examiner.*

NICHOLAS S. RIZZO, *Examiner.*